June 10, 1952　　H. I. SCHLESINGER ET AL　　2,600,370
URANIUM BOROHYDRIDE AND METHOD OF MAKING THE SAME
Filed Feb. 4, 1946
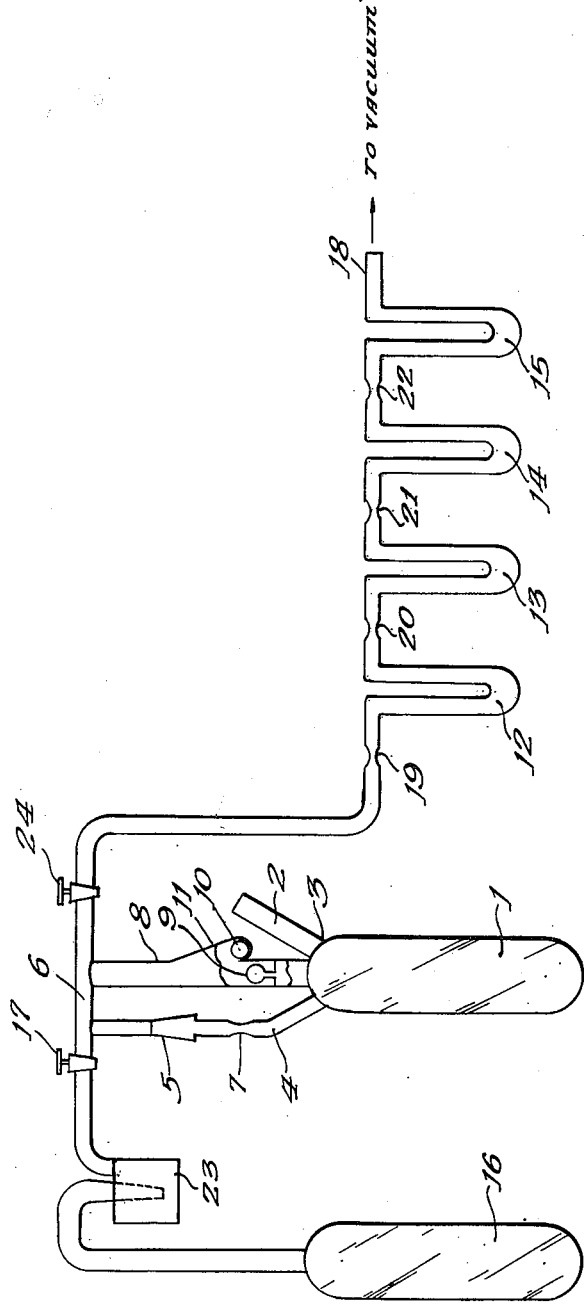
Witnesses:
Meyer A. Baskin
John A. McIlroy
Inventors:
Hermann I. Schlesinger
Herbert C. Brown
By: Robert H. Lavender
Attorney Patented June 10, 1952

2,600,370

UNITED STATES PATENT OFFICE 2,600,370

URANIUM BOROHYDRIDE AND METHOD OF MAKING THE SAME

Hermann I. Schlesinger, Chicago, Ill., and Herbert C. Brown, Detroit, Mich., assignors to the United States of America as represented by the United States Atomic Energy Commission Application February 4, 1946, Serial No. 645,456

13 Claims. (Cl. 23—14.5)

This invention relates to uranium borohydride and methods of preparing the same.

It is an object of the present invention to provide a convenient and efficient method of preparing uranium borohydride.

It is a more specific object of the invention to provide a process in which a uranium halide is reacted with a borohydride to form uranium borohydride.

A further object of the present invention is to provide a new volatile uranium compound.

Further objects and advantages will appear from the following description.

It is known that uranium occurs in the form of at least three isotopes having atomic weights of 238, 235 and 234. It is particularly important to separate uranium 235 which in naturally occurring uranium occurs in the ratio of about 1 part of uranium 235 to 140 parts of uranium 238. Uranium 235 is important for use in neutronic physics studies and for the production of chain reacting neutronic systems. Due to the small difference in weight of uranium 235 as compared with uranium 238, the separation of these isotopes is a particularly difficult problem.

One method of separating these uranium isotopes is by taking advantage of the difference in tendency of the respective isotopic compounds in vapor state to diffuse through a permeable barrier. Because of the high atomic weight of uranium, volatile compounds are few in number. One such volatile compound is uranium hexafluoride. This compound has been used for isotope separation, but has certain disadvantages, particularly its tendency to corrode ordinary materials.

In accordance with the present invention, it has been found that uranium borohydride is a novel volatile compound having very desirable properties for use in uranium isotope separation by barrier vapor diffusion methods.

It has been found that uranium borohydride, $U(BH_4)_4$, may be obtained by the reaction of a metal borohydride with a uranium tetrahalide. The preferred process is the reaction of uranium tetrafluoride with aluminum borohydride. Since the latter compound is a volatile liquid, the reaction proceeds without any other liquid medium. The products of the reaction are uranium borohydride and aluminum fluoride, or aluminum fluoroborohydrides, as illustrated by the following equation:

$$UF_4 + 2Al(BH_4)_3 \rightarrow U(BH_4)_4 + 2AlBH_4F_2$$

Other uranium halides, such as uranium tetrachloride, and other metal borohydrides, such as the borohydrides of sodium, potassium, lithium, magnesium, and beryllium, may also be employed. In reactions in which all of the reactants are solids, the use of a non-aqueous medium such as ethyl ether is advantageous.

Due to the great inflammability of aluminum borohydride, it is necessary to effect the reaction of these materials in a high vacuum or in an inert atmosphere. Under such conditions, anhydrous uranium tetrafluoride reacts spontaneously and exothermically with anhydrous aluminum borohydride. During the course of the reaction the light green finely divided uranium tetrafluoride is replaced by lustrous green crystals which in larger aggregates appear almost black. After removal of residual aluminum borohydride, the product crystals may be sublimed in high vacuum at room temperature into a suitable receiving vessel at a lower temperature.

In carrying out the reaction, the metal borohydride is preferably introduced into a suitable reaction chamber which contains the desired uranium tetrahalide in carefully dehydrated condition, and which has been substantially evacuated and cooled to temperatures approximating that of liquid nitrogen. Thereafter the chamber is sealed and the temperature gradually increased up to about fifty degrees or below, depending on the particular metal borohydride employed in the reaction.

A suitable form of apparatus for carrying out this reaction is shown in the accompanying drawing. The aforesaid drawing shows a glass reaction chamber 1 with a side arm 2 joined to reaction chamber 1 at point 3. Another side arm 4 is connected through a ground glass joint 5 with a line 6. The side arm 4 is arranged so that it can be readily sealed off at constricted point 7. The reaction chamber is also connected to the vacuum line 6 by means of tube 8 which at the beginning of the reaction is closed off by a thin spherical glass closure 9. This glass closure 9 can be broken by an iron ball 10 which is normally held in side arm 11. The iron ball 10 can be moved so as to break the closure 9 by means of an external magnet not shown. The line 6 is connected at one end 18 to a vacuum pump, not shown, through stopcock 24 and a series of traps 12, 13, 14, and 15 connected with each other and with line 6 through constrictions 19, 20, 21, and 22 so that the traps can be readily sealed off. A chamber 16 is connected to line 6 through trap 23 and stopcock 17.

In operating the apparatus described uranium tetrafluoride is introduced through arm 2 into the reaction vessel 1, which is then sealed off at point 3. The reaction chamber 1 is heated while being evacuated through line 6. When the pressure is down to about $10^{-4}$ mm. of mercury, the reaction chamber 1 is cooled by immersion in a liquid nitrogen bath. The aluminum borohydride is then distilled into the reaction chamber 1 from container 16 through trap 23 and stopcock 17.

Trap 23 is maintained at $-40°$ C. by external cooling means not shown so as to remove all traces of mercury vapor that might have entered from manometers employed in the vacuum line. After the aluminum borohydride is completely distilled into the reaction chamber 1, the chamber is sealed off at point 7 and placed in an ice salt bath for from 8 to 12 hours. The mixture is then removed from the ice salt bath and maintained at room temperature for about 2 hours. The reaction chamber 1 is then removed from the ice salt bath and is sealed to the vacuum system through line 8. It is then again cooled to the temperature of liquid nitrogen, and the entire line 6 and the traps 12, 13, 14, and 15 are thoroughly evacuated. Trap 15 is immersed in liquid nitrogen and trap 14 is immersed in a salt ice mixture.

The closure 9 is then broken by means of the iron ball 10 using an external magnet and the reaction chamber 1 is allowed to come to room temperature. The uranium borohydride thus produced is distilled out of reaction chamber 1 and collected in trap 14. Unreacted aluminum borohydride collects in trap 15. After the desired amount of uranium borohydride has collected in trap 14, trap 13 is also immersed in an ice salt bath so that the product collects in trap 13. When the desired amount of product has collected in trap 13, trap 12 is immersed in an ice salt bath. In this way the uranium borohydride product is divided into three portions in traps 12, 13, and 14.

To avoid condensation of the uranium borohydride in the collecting lines the latter are warmed to about 50° C. from time to time. The collection of the product requires approximately 8 hours depending upon the size of apparatus. In order to obtain a satisfactory yield, it is necessary to heat the reaction chamber to a temperature from about 50° C. to about 65° C. Before removing the traps containing the product they are immersed in liquid nitrogen for about 30 minutes while still under vacuum. This thoroughly condenses the product and prevents the decomposition of uranium borohydride with the deposition of mirrors at the sealing points in the lines. The traps are then sealed off at constricted points 19, 20, 21, and 22.

The unreacted aluminum borohydride in trap 15 can be redistilled into container 16 for use in another run.

The following example illustrates the process of making the product of the present invention. All parts are by weight unless otherwise stated.

*Example 1*

Twenty-seven and fifty-nine hundredths grams (0.088 mol.) of anhydrous uranium tetrafluoride was introduced into reaction chamber 1 through side arm 2 as described above. To remove the last traces of moisture from the uranium tetrafluoride, the reaction chamber 1 was slowly heated to 350° C. while evacuating to $10^{-4}$ mm. of mercury. The reaction chamber 1 was then cooled in a liquid nitrogen bath and 11.22 grams (0.157 mol.) of aluminum borohydride was distilled into reaction chamber 1 from container 16 as described above. After the aluminum borohydride was completely distilled into the reaction chamber 1 it was sealed off at point 7 and allowed to stand in an ice salt bath for from 8 to 12 hours. Reaction chamber 1 was then maintained at room temperature for about 3 hours.

Traps 12, 13, 14, and 15 were cooled and the system evacuated as described above. Glass diaphragm 9 was then opened by magnetic breaker 10. The product was distilled successively into traps 14, 13, and 12 and the unreacted aluminum borohydride was distilled into trap 15 as described above.

The following example was carried out to illustrate a process for making uranium borohydride from lithium borohydride in a non-aqueous solvent.

*Example 2*

In an evacuated reaction vessel 2 parts of anhydrous uranium tetrafluoride was heated at 360° C. for 15 minutes to remove moisture traces. After the vessel had cooled to about room temperature a stream of dry nitrogen was allowed to sweep slowly through the vessel. About 0.7 part of lithium borohydride and 18.4 parts of thoroughly dried ether were introduced into the vessel. The contents were cooled to liquid nitrogen temperature. The vessel was then evacuated and sealed off. The sealed reaction vessel was then heated with constant agitation at 50° C. for 14 hours at which time the ether solution had turned green. The heating was continued for about 6 hours longer during which time the color deepened. The reaction vessel was then reconnected to a vacuum line through a magnetic breaker device. By the usual procedures the presence of a small amount of non-condensable gas presumably hydrogen and the absence of diborane were demonstrated. The ether was evaporated and the residue was uranium borohydride. The vapor tension of uranium borohydride is one of the properties of this compound which is useful for identification. Vapor tensions at various temperatures are shown in the following table:

*Table*

Vapor tensions (observed for uranium borohydride)

| Temperature Degrees Centigrade | 34.2 | 40.2 | 48.25 | 54.3 | 61.3 |
|---|---|---|---|---|---|
| Pressure millimeters mercury | 0.30 | 0.56 | 1.23 | 2.15 | 4.00 |

Many solvents such as water and alcohol react with uranium borohydride. For example, water and alcohols liberate hydrogen on reaction with uranium borohydride, and ethyl ether forms an etherate containing one molecule of ethyl ether for each molecule of uranium borohydride. This etherate is stable at $-80°$ C.

Uranium borohydride is slightly soluble in n-heptane. Highly purified benzene does not react with uranium borohydride but the borohydride is only slightly soluble in this solvent. It reacts slowly with air to produce a yellow or white non-volatile product.

The above detailed description is given for purposes of illustration and specific details thereof are not intended to limit the scope of the invention which is to be limited only by the scope of the following claims.

What is claimed is:

1. Uranium borohydride.
2. The process of preparing uranium borohydride that comprises reacting a metal borohydride with a uranium tetrahalide in a non-aqueous liquid medium.
3. The process of preparing uranium borohydride that comprises reacting an alkali metal borohydride with a uranium tetrahalide in a non-aqueous liquid medium.
4. The process of preparing uranium borohydride that comprises reacting lithium borohydride with uranium tetrafluoride in a non-aqueous liquid medium.
5. The process of preparing uranium borohydride that comprises reacting lithium borohydride with uranium tetrafluoride in anhydrous ether.
6. The process of preparing uranium borohydride that comprises reacting aluminum borohydride with a uranium tetrahalide in an anhydrous state.
7. The process of preparing uranium borohydride that comprises reacting a metal borohydride with uranium tetrafluoride in a non-aqueous liquid medium.
8. The process of preparing uranium borohydride that comprises reacting aluminum borohydride with uranium tetrachloride.
9. The process of preparing uranium borohydride that comprises reacting aluminum borohydride with uranium tetrahalide in an anhydrous state at room temperature.
10. The process of preparing uranium borohydride that comprises reacting aluminum borohydride with uranium tetrahalide in an anhydrous liquid medium and in a vacuum.
11. The process of preparing uranium borohydride that comprises reacting aluminum borohydride with uranium tetrafluoride in an anhydrous state, under vacuum, and distilling the product from the reaction mixture.
12. The process of preparing uranium borohydride that comprises reacting aluminum borohydride with uranium tetrafluoride in a high vacuum, distilling off and recovering the unreacted aluminum borohydride, and distilling off and recovering the uranium borohydride.
13. The process of preparing uranium borohydride that comprises reacting aluminum borohydride with uranium tetrafluoride in a high vacuum, carrying out the first part of the reaction at a temperature substantially below room temperature, and carrying out the final part of the reaction at substantially room temperature.

HERMANN I. SCHLESINGER.
HERBERT C. BROWN.

No references cited.